3,244,108
WINDSHIELD WASHERS FOR ROAD VEHICLES
Albert William Winkley, Four Oaks, and John Herbert Kenning, Maney, Sutton Coldfield, England, assignors to Joseph Lucas (Industries) Limited, Birmingham, England
Filed Feb. 28, 1964, Ser. No. 348,148
Claims priority, application Great Britain, Mar. 13, 1963, 9,898/63
7 Claims. (Cl. 103—23)

This invention relates to windshield washers for road vehicles, and has for its object to provide a windshield washer in a convenient form.

A windshield washer according to the invention comprises in combination a pump, which in use supplies cleansing liquid to a windshield, a rotor adapted to be driven by a motor, a spiral groove in a face of the rotor, means for engaging a control finger in said groove and for commencing operation of the pump, and means operable when the control finger reaches a predetermined position in the groove for ceasing operation of the pump.

Figure 1:
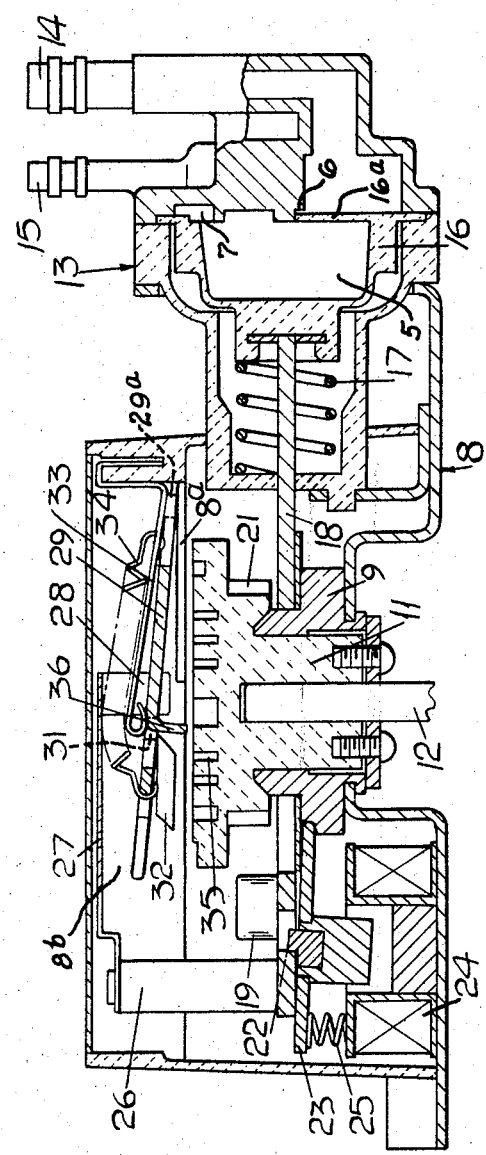
Figure 2:
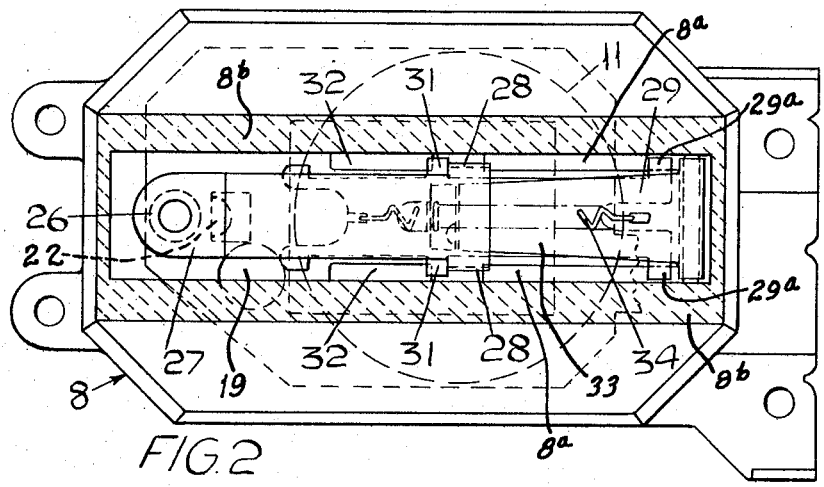
Figure 3:
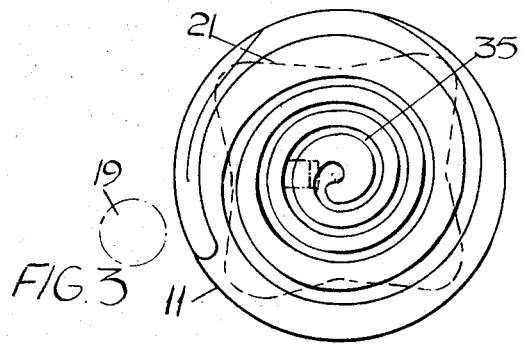
Figure 4:
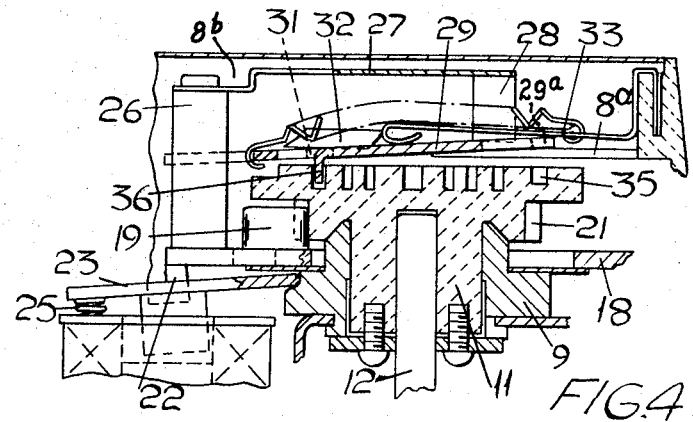

In the accompanying drawings, FIGURE 1 is a part-sectional side view illustrating one example of the invention, FIGURE 2 is a plan view of part of FIGURE 1 with the grooves in the rotor omitted for clarity, FIGURE 3 is a plan view of the rotor, and FIGURE 4 is a fragmentary view corresponding to part of FIGURE 1 but illustrating the various parts at an instant during a cycle of operation.

Referring to the drawings, the washer includes a multi-part housing 8 which supports a bush 9 within which is rotatably journalled a rotor 11. The rotor is permanently connected through a shaft 12 to the windshield wiper motor of a vehicle with which the washer is associated, so that the rotor is driven whenever the windshield wipers are operating.

The housing supports a pump 13 which includes an inlet 14 for connection to a reservoir, an outlet 15 for connection to nozzles which direct water onto the windshield, and a pumping diaphragm 16 which is urged in the direction of its pumping stroke by a spring 17. Movements of the diaphragm 16 against the action of the spring 17 are effected by a pumping plate 18 which is mounted for reciprocatory movement in the housing and is secured at one end of the diaphragm when the diaphragm 16 is moved against the action of the spring 17, a suction is created in the pump chamber 5 and water from the inlet 14 is drawn into the chamber 5 past a pivoted flap 16a integral with the diaphragm 16. On the pumping stroke, the flap 16a seats on a shoulder 6 to block the inlet 14, and the water is pumped through a port 7 to the outlet 15. A valve (not shown) is provided in the outlet 15 in the usual way to prevent air from being sucked in through the outlet. In the plate 18 is formed an aperture through which the bush 9 extends, and upstanding from the plate 18 is a follower in the form of a roller 19 which when the washer is in operation engages a cam 21 on the underside of the rotor 11 in a manner to be described. The plate 18 is held in the position shown in FIGURE 1 by a catch 22 carried by the armature 23 of a solenoid 24, the armature being loaded by a spring 25 to a position in which the catch 22 engages an aperture in the plate 18.

Upstanding from the end of the plate 18 remote from the pump 13 is a pillar 26 to the upper end of which is secured a plate 27 which extends over the upper surface of the rotor 11 in spaced relationship, the plate 27 terminating at a position adjacent the centre of the rotor and being formed integrally with a pair of lugs 28 which extend downwardly towards the rotor.

Reciprocably mounted in the space between the plate 27 and the rotor 11 is a control plate 29 one end of which is formed with a pair of outwardly directed lugs 29a which slide on ledges 8a secured to and extending inwardly from parts 8b of the housing 8, and the other end of which is formed with a pair of integral lugs 31. The lugs 31 engage the surfaces of a pair of cams 32 which are secured to the parts 8b respectively, and are shaped to the form of parallelograms, the arrangement being such that the plate 29 can slide between the cams 32 with the lugs 31 sliding around the cams.

The plate 29 is urged downwardly towards the rotor 11 by a leaf spring 33 acting between the housing 8 and the plate 29, and is urged in a direction away from the pillar 26 by a helical tension spring 34 acting between the plate 29 and the spring 33. In the position shown in FIGURE 2, movement of the plate 29 away from the pillar 26 under the action of the spring 34 is limited by abutment between the lugs 31 and the lugs 28, which are positioned so that they will contact the lugs 31 as best seen in FIGURE 2 and movement of the plate 29 towards the rotor 11 is limited by the abutment between the lugs 31 and the upper surfaces of the cams 32.

In the upper surface of the rotor 11 is formed a spiral groove 35 which commences at the centre of the rotor and, as best shown in FIGURE 3, consists of a number of turns of relatively small pitch followed by one or more turns of greater pitch. Moreover, adjacent its outer end the depth of the groove decreases as seen in FIGURES 1 and 4.

In use, assuming that the windshield wipers are operating so that the rotor 11 is rotating, a switch is closed momentarily when it is desired to operate the washer, this switch completing a circuit to the solenoid 24, which attracts the armature 23 against the action of the spring 25. The catch 22 is now released, and the plate 18 is moved to the right by the spring 17, so that the roller 19 engages the cam 21. Although there is no coupling between the rotor 11 and the pump 13, the combined action of the spring 17 and cam 21 now operates the pump. During operation of the pump, the catch 22 glides on the underside of the plate 18, but the stroke of the pump is insufficient to cause the catch 22 to re-engage the plate.

As soon as the plate 18 moves to the right, movement of the pillar with the plate 18 moves the lugs 28 to the right, but the spring 34 maintains the lugs 28, 31 in contact. In the position shown in FIGURE 1, a finger 36 formed integrally with the plate 29 is spaced from the rotor 11, but when the lugs 31 reach the end of the upper surfaces of the cams 32, the spring 33 moves the plate 29 downwardly and causes the finger 36 to engage the centre of the groove 35. The lugs 28, 31 now become separated, the lugs 28 reciprocating with the plate 18. By virtue of the rotation of the rotor 11, the finger 36 moves along the groove 35 so that the plate 29 moves to the left. For several pumping strokes the plate 29 does not contact the pillar, but as the finger 36 approaches the end of the groove the bifurcated end of the plate 29 engages the pillar, the parts now occupying the position shown in FIGURE 4. Further movement of the finger along the groove causes the plate 29 to move the pillar and the plate 18 to the left so that the roller 19 and cam 21 are separated and pumping is ceased, and the catch 22 is re-engaged with the plate 18. At this stage, the lugs 31 have reached the ends of the lower faces of the cams 32 and the decreasing depth of groove 35 forces the finger 36 upwards and out of engagement. The plate 29 is then urged to the right by the spring 34 and slides along the top surface of the cams 32 to re-establish the position shown in FIGURE 1.

Having thus described our invention what we claim as new and desire to secure by Letters Patent is:

1. A windshield washer comprising in combination a pump which in use supplies cleansing liquid to a windshield, a rotor adapted to be driven by a motor, a spiral groove in a face of the rotor, means for engaging a control finger in said groove and for commencing operation of the pump, and means operable when the control finger reaches a predetermined position in the groove for ceasing operation of the pump.

2. A windshield washer as claimed in claim 1 including a pumping plate connected to the reciprocal member of the pump, resilient means urging the reciprocal member and pumping plate in one direction, a follower carried by the pumping plate and engageable with a cam on the rotor under the action of the resilient means so that when the rotor is rotating and the follower is engaged with the cam the cam and resilient means serve to operate the pump, a catch for holding the pumping plate in a position in which the follower is disengaged from the cam, and means for releasing the catch to permit operation of the pump and for re-engaging the catch to stop operation of the pump when the control finger reaches said predetermined position.

3. A windshield washer as claimed in claim 2 including a control plate carrying the control finger, resilient means urging the control finger into the centre of the groove, stop means holding the control plate in a position in which the finger is out of the groove, means whereby release of the catch operates the stop means to permit the control finger to engage the centre of the groove, the control plate engaging a part carried by the pumping plate when the finger reaches said predetermined position so that the pumping plate is moved by the control plate to a position in which the catch is re-engaged, and resilient means for returning the control plate to the position in which it is held by the stop means.

4. A windshield washer as claimed in claim 3 in which the spiral groove consists of a number of turns of relatively small pitch followed by one or more turns of greater pitch, the control plate engaging said part when the finger is in a turn of the groove of greater pitch.

5. A windshield washer as claimed in claim 4 in which the depth of the groove decreases adjacent its outer end.

6. A windshield washer as claimed in claim 3 including a pair of fixed cams, and lugs carried by the control plate and engaging the fixed cams to guide the control plate.

7. A windshield washer as claimed in claim 2 in which the catch is carried by the armature of a solenoid and is resiliently urged to the position in which it engages the pumping plate.

References Cited by the Examiner

UNITED STATES PATENTS

| | | | |
|---|---|---|---|
| 2,936,476 | 5/1960 | Ziegler | 103—23 |
| 2,959,803 | 12/1963 | Ziegler | 103—23 |
| 3,115,095 | 12/1963 | Ziegler | 103—23 |
| 3,152,726 | 10/1964 | Chivers | 103—23 |

FOREIGN PATENTS 5,273  9/1909  Great Britain.

SAMUEL LEVINE, *Primary Examiner.*

W. L. FREEH, *Assistant Examiner.*